United States Patent

Cummins

[11] Patent Number: 5,713,588
[45] Date of Patent: Feb. 3, 1998

[54] ADJUSTABLE FENDER ASSEMBLY FOR CHILDREN'S RIDE-ON VEHICLE

[75] Inventor: Steven M. Cummins, Fort Wayne, Ind.

[73] Assignee: Mattel, Inc., El Segundo, Calif.

[21] Appl. No.: 598,644

[22] Filed: Feb. 6, 1996

[51] Int. Cl.[6] .................................................. B62B 9/16
[52] U.S. Cl. ............................... 280/152.1; 280/852
[58] Field of Search .................... 280/152.1, 152.2, 280/152.3, 847, 851, 852; 293/105

[56] References Cited

U.S. PATENT DOCUMENTS

| | | | |
|---|---|---|---|
| 2,010,450 | 8/1935 | Anderson | 280/152.1 |
| 2,510,222 | 6/1950 | Harley | 280/152.1 |
| 4,458,909 | 7/1984 | Morioka | 280/152.2 |
| 4,620,713 | 11/1986 | Sakaguchi | 280/152.1 |
| 5,026,083 | 6/1991 | Wendarf | 280/152.1 |
| 5,186,274 | 2/1993 | Hegman | 280/152.1 |

*Primary Examiner*—Ricard M. Camby
*Attorney, Agent, or Firm*—Kolisch, Hartwell, Dickinson, McCormack & Heuser

[57] ABSTRACT

An adjustable fender assembly for use with a children's ride-on vehicle including a body and a wheel spaced apart from the body. A support structure extends between and connects the body and the wheel. The fender assembly includes a fender movably mounted to the support structure and disposed between the body and the wheel for motion toward and away from the wheel. A spacer assembly is disposed on the support structure adjacent the fender to fix the position of the fender on the support structure. By modifying the spacer assembly, it is possible to move the fender on the support structure to allow wheels of various diameters to be used.

13 Claims, 3 Drawing Sheets

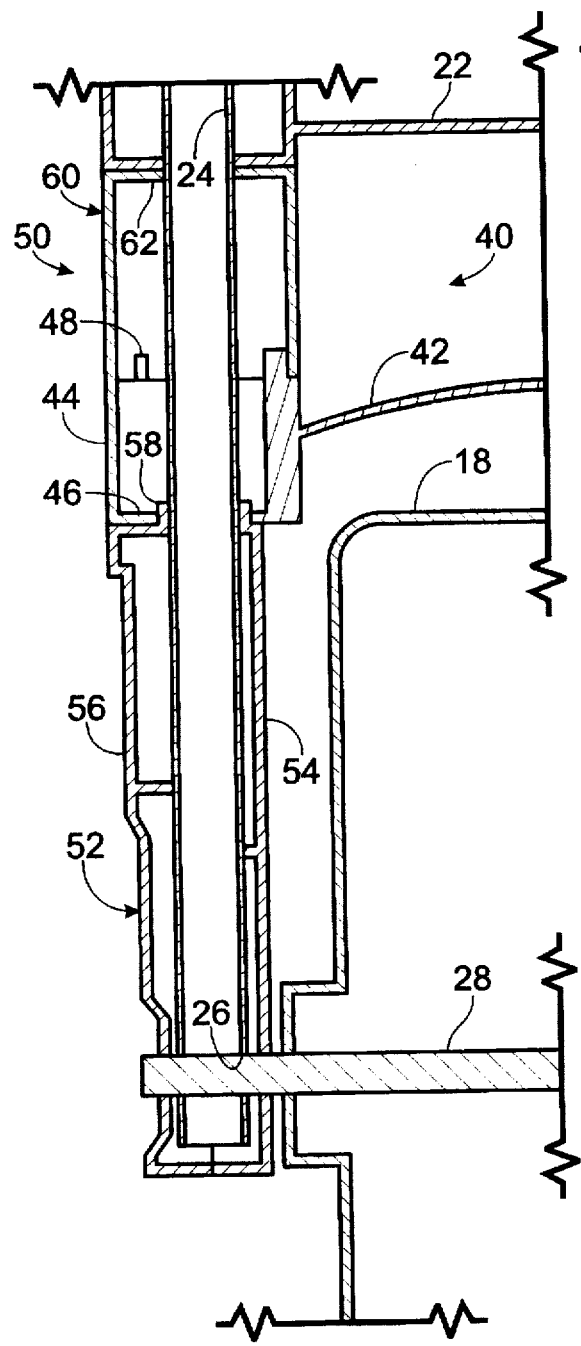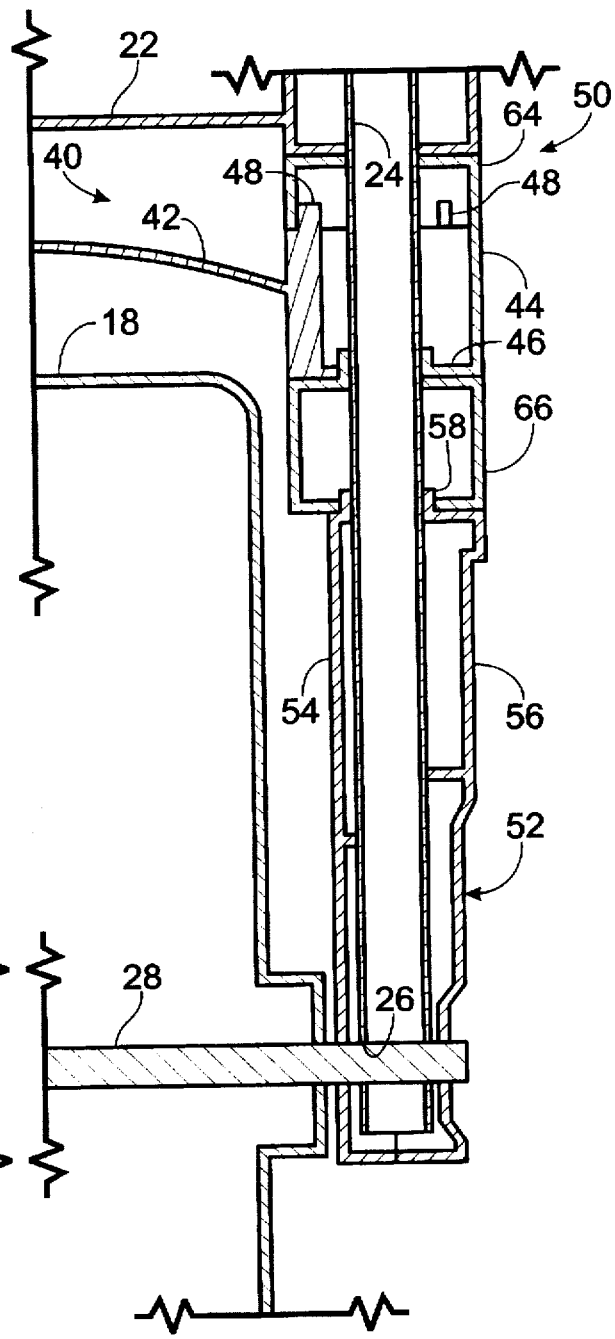

ADJUSTABLE FENDER ASSEMBLY FOR CHILDREN'S RIDE-ON VEHICLE

BACKGROUND AND SUMMARY OF THE INVENTION

This invention relates generally to children's ride-on vehicles, and more particularly to an adjustable fender assembly for use on the front forks of a three-wheel ride-on vehicle.

Children's ride-on vehicles are manufactured in different sizes and configurations to suit the sizes and interests of different children. Young children, for instance, need small, relatively slow vehicles which they can safely control and get on and off of safely. Larger and fastest vehicles, on the other hand, are more appropriate for older and bigger children. Even among children of the same size, some have interests that are better satisfied, for instance, by off-road style vehicles and others prefer racing vehicles.

Although producing many different vehicles closely tailored to the size and interests of many different children is beneficial from the standpoint of marketing, the unit production cost for a given vehicle is inversely proportional to the number produced. One of the largest costs associated with creating different vehicles are the molds used to manufacture the various components. It is therefore desirable to maximize the number of components that can be reused from vehicle to vehicle.

One way to alter the size and appearance of a particular vehicle is to change the size of the wheels. A particular vehicle with small tires may be short enough for use by smaller riders and the same vehicle with larger tires may be large enough to suit a larger rider. In addition, smaller or larger tires may be used to change the character of a vehicle, as for instance, changing it from on-road to off-road style. Thus, altering the tire size can be part of an overall appearance change as well as a change in the size of a vehicle.

With known ride-on vehicles, changing the size of the tires often requires other significant changes to the design of the vehicle. For example, larger wheel wells or higher fenders may be needed with larger tires. Due to the cost of modifying or replacing molds, it is expensive to change the design of existing parts to accommodate larger tires. It is therefore preferable to design parts that can be used with various tire sizes with minimum modification.

It is an object of the present invention to provide an adjustable fender assembly for use on a front wheel of a three-wheel ride-on vehicle that can accommodate different diameter tires with minimum modification.

SUMMARY OF THE INVENTION

The invention achieves these and other objects by providing an adjustable fender assembly for use with a children's ride-on vehicle including a body and a wheel spaced apart from the body. A support structure extends between and connects the body and the wheel. The fender assembly includes a fender slidably mounted to the support structure for movement toward and away from the wheel and disposed between the body and the wheel. A spacer assembly is disposed on the support structure adjacent the fender to fix the position of the fender on the support structure. By modifying the spacer assembly, it is possible to move the fender on the support structure to allow wheels of various diameters to be used.

Many other features, advantages and additional objects of the present invention will become manifest to those versed in the art upon making reference to the detailed description which follows and the accompanying sheets of drawings in which preferred embodiments incorporating the principles of this invention are disclosed as illustrative examples only.

BRIEF DESCRIPTION OF THE DRAWINGS

FIG. 2a is a sectional view of the an adjustable fender assembly of the vehicle of FIG. 1.

FIG. 2a is a sectional view of the adjustable fender assembly of FIG. 2a in a second configuration.

FIG. 3 is a partially-exploded perspective view of a front fork and the fender assembly for FIG. 2a.

DETAILED DESCRIPTION OF THE PREFERRED EMBODIMENT

Figure 1:
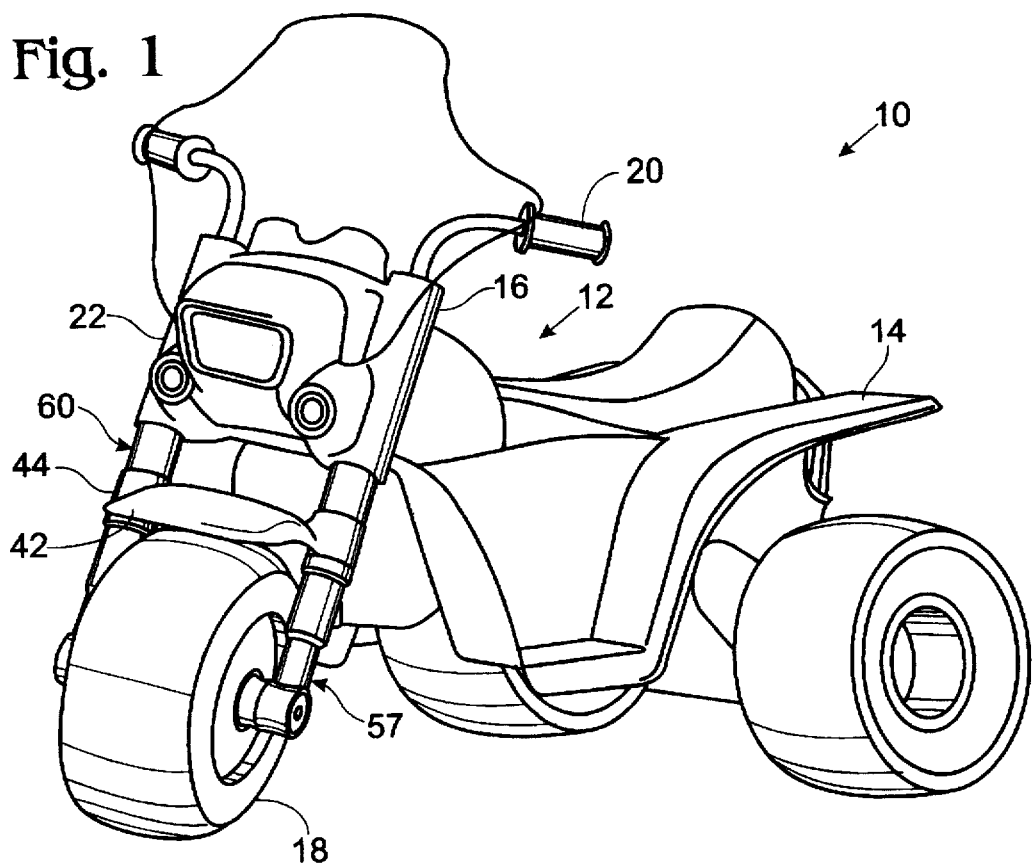
FIG. 1 is a perspective view of a children's ride-on vehicle according to the present invention.

A children's ride-on vehicle is shown generally at 10 in FIG. 1. In the preferred embodiment, vehicle 10 is modeled after a three-wheel all-terrain-vehicle (ATV). Vehicle 10 includes a body 12 with a fixed portion 14 and a moveable portion 16. Moveable portion 16 carries a from wheel 18 and includes handle bars 20 and a fairing 22 and is pivotally coupled to fixed portion 14 to steer the vehicle.

A support structure in the form of a pair of fork tubes 24 extends downward from moveable portion 16 to support the wheel. See FIGS. 2a–b. The tube and handle bar on each side are preferably formed from a single piece of ¾" metal tubing bent generally in the shape of an upside-down L. Tubes 24 each include a transverse hole 26 at their lower ends to receive an axle 28 on which the wheel rides. Both tubes are screwed to fairing 22, which serves to connect the tubes to each other as well as to the moveable portion.

Figure 3:
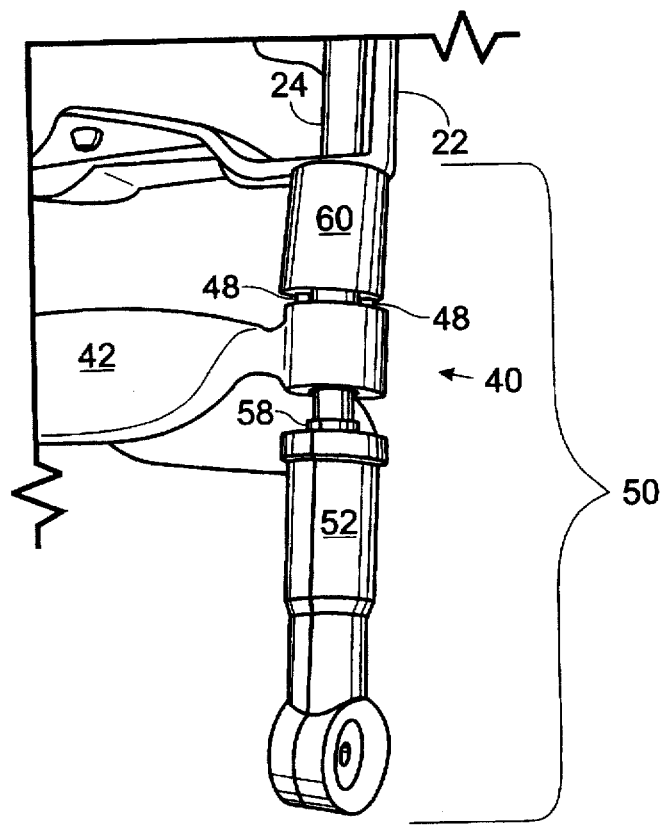

An adjustable fender assembly 40 is mounted on the fork tubes and includes a fender 42 disposed between the forks and between the body and the wheel. See FIG. 5. Fender 42 includes a cylindrical sleeve 44 on each side to slide over the fork tubes. An inwardly projecting flange 46 is formed at the bottom of each sleeve 44. Three radially oriented tabs 48 are formed inside and project slightly above the top of sleeve 44 at 120-degree intervals, as shown in FIG. 3.

Figure 4:
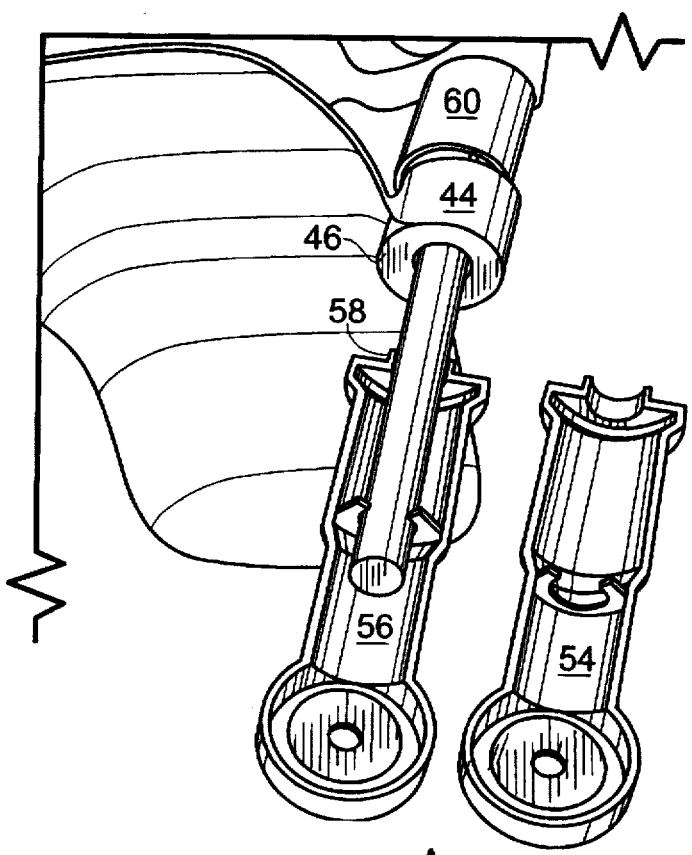
FIG. 4 is a perspective view of two halves of a lower fixed portion of a spacer assembly according to the present invention.

Fender assembly 40 also includes a spacer assembly 50, which establishes the position of fender 42 on the fork tubes. In the preferred embodiment, spacer assembly 50 includes a fixed lower portion 52 molded in the form of a shock absorber. As shown in FIG. 4, each lower portion includes inside and outside halves 54, 56 which meet in a plane intersecting the axis of the tube. A bushing 58 is formed at the top of each lower portion to fit around the tube and within flange 46. This arrangement holds the two halves together and centers the sleeve over the tube.

When the lower portions are installed on the fork tubes, a space of about 4 inches between the top of the lower portions and the bottom of the fairing is left for the fender sleeves. Because the fender sleeves are about 1⅝ inches in height, this allows the fender to be positioned anywhere over a range of about 2⅜ inches along the tubes. The position of the fender within this range is set by a positioning spacer 60 with a total length of about 2⅜ inches. In the embodiment shown in FIGS. 1 and 2a, spacer 60 is formed as a single piece which fits over the tube between the top of the fender sleeve and the bottom of the fairing. Note that an inwardly depending flange 62 is formed at the top of spacer 60 to center the spacer on the tube at the top. The lower end of the spacer is centered by fitting over tabs 48.

The embodiment described above moves the fender to its lowest position, which accommodates a wheel of about 12 inches diameter. If a larger wheel is to be used, spacer 60 is divided into an upper portion 64 and a lower portion 66, as shown in FIG. 2b. In that embodiment, the length of lower portion 66 is approximately 1½ inches, with upper portion 64 being about 1⅛ inches long. This moves the fender up by 1½ inches, thereby allowing use of a wheel with a diameter 3 inches larger than the embodiment shown in FIG. 2a.

The above-described invention provides an economical, attractive fender assembly for use with a children's ride-on vehicle. An important benefit of the above-described adjustable fender assembly is the ability to accommodate wheels of various diameters with the modification of only one piece of the structure. Because of the expense of creating new molds, reducing the number of parts that must be modified is critical to minimizing the overall cost of producing different vehicles. Moreover, the structure of the one part that is modified for different diameter wheels, the spacer, is very simple, which further reduces the cost of producing a vehicle with a different wheel size.

Figure 5:
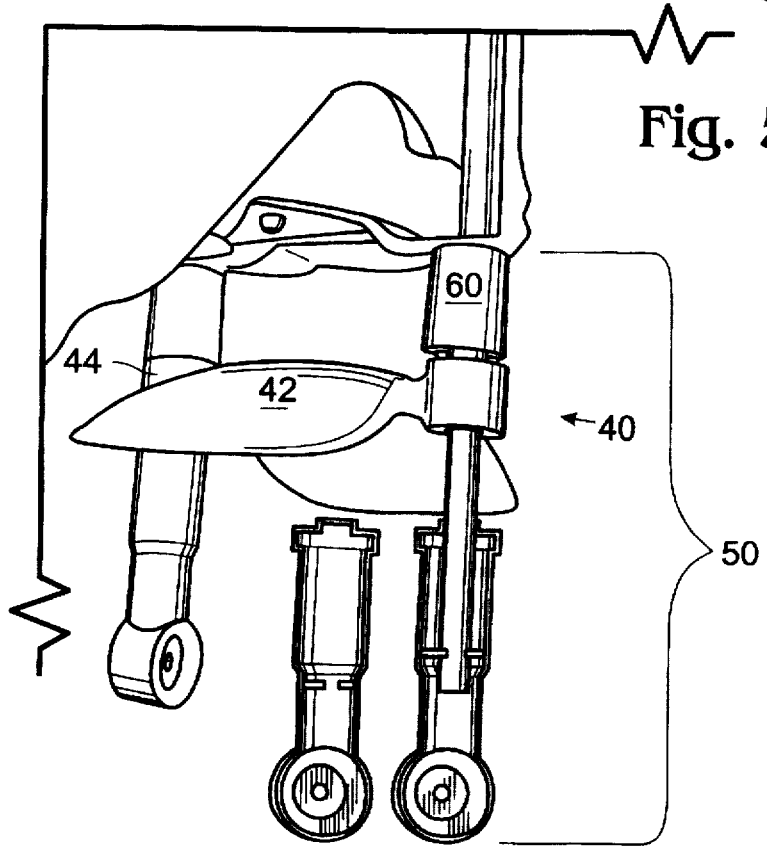
FIG. 5 shows the fender assembly of FIG. 2a partially installed on the front forks.

Because ride-on vehicles are often assembled by the purchaser, it is important to make final assembly as simple as possible. As shown in FIGS. 3–5, each of the pieces in the above-described structure simply slips over the fork tubes during assembly and the entire fender assembly is locked in place by the axle, thus eliminating the need for screws or other fasteners. This arrangement results in a quick and easy assembly process.

While the present invention has been shown and described with reference to the foregoing preferred embodiment, it is to be understood by those of skill in the art that other changes in form and detail may be made therein without departing from the spirit and scope of the invention as defined in the appended claims.

I claim:

1. An adjustable fender assembly for use with a child's ride-on vehicle including a body, a wheel spaced apart from the body and a pair of fork tubes extending between and connecting the body and the wheel, the assembly comprising:
    a fender slidably mounted to the fork tubes for movement toward and away from the wheel and disposed between the body and the wheel wherein the fender includes a pair of sleeves which fit slidably over the fork tubes to secure the fender thereto; and
    a spacer assembly disposed on the fork tubes adjacent the fender to fix the position of the fender on the fork tubes.

2. The adjustable fender assembly of claim 1 wherein the spacer assembly includes lower portions disposed over the fork tubes adjacent the bottom of the sleeves and upper portions disposed over the fork tubes adjacent the top of the sleeves.

3. The adjustable fender assembly of claim 1 wherein the spacer assembly includes a fixed lower portion disposed over fork tubes below the sleeves and positioning spacers disposed over the fork tubes partially above and partially below the sleeves.

4. The adjustable fender assembly of claim 3 wherein the fixed lower portion is molded to have the appearance of a shock absorber.

5. The adjustable fender assembly of claim 4 wherein the sleeves and positioning spacers are cylindrical and sized to match the upper end of the fixed lower portion.

6. A child's ride-on vehicle comprising:
    a body;
    at least one rear wheel rotatably coupled to the body;
    at least one front wheel rotatably coupled to and spaced apart from the body opposite the rear wheel;
    a pair of fork tubes extending between and coupling the front wheel and the body;
    an adjustable fender assembly disposed between the body and the front wheel and slidably mounted to the fork tubes for movement toward and away from the wheel, wherein the fender includes a pair of sleeves which fit slidably over the fork tubes to secure the fender thereto; and
    a spacer assembly disposed on the fork tubes adjacent the fender to fix the position of the fender on the fork tubes.

7. The vehicle of claim 6 wherein the body includes a fixed portion and a moveable portion and the support structure is fixed to the moveable portion.

8. A child's ride-on vehicle comprising:
    a body;
    a first wheel spaced apart from the body and having a first diameter;
    a pair of rigid fork tubes extending between and connecting the body and the wheel and holding the wheel at a fixed spacing from the body;
    a fender adjustably mounted to the fork tubes for placement at one of plural predetermined positions on the fork tubes corresponding to plural wheel diameters; and
    a spacer assembly configured to be used with the first wheel and disposed on the fork tubes adjacent the fender to fix the position of the fender on the fork tubes at a selected one of the plural predetermined positions corresponding to the first diameter so that the fender has a predetermined and fixed spacing from the wheel and from the body.

9. The vehicle of claim 8 wherein the fender includes a pair of sleeves which fit slidably over the fork tubes to secure the fender thereto.

10. The vehicle of claim 9 wherein the spacer assembly includes lower portions disposed over the fork tubes adjacent the bottom of the fender and upper portions disposed over the fork tubes adjacent the top of the fender, where the upper and lower portions capture the fender therebetween.

11. The vehicle of claim 8 wherein the spacer assembly includes a fixed lower portion disposed over the fork tubes below the fender and at least one spacer disposed over the fork tubes above the fixed lower portion.

12. The vehicle of claim 11 wherein the fixed lower portion is molded to have the appearance of a shock absorber.

13. The vehicle of claim 12 wherein the sleeves and spacer are cylindrical and sized to form a substantially continuous extension of the fixed lower portion.

* * * * *